US012667781B2

(12) United States Patent
Zhang

(10) Patent No.: US 12,667,781 B2
(45) Date of Patent: Jun. 30, 2026

(54) METHOD, APPARATUS, STORAGE MEDIUM, AND ELECTRONIC DEVICE FOR DISPLAYING DIRECTIONAL ICONS FOR PROMPTING TASK

(71) Applicant: Tencent Technology (Shenzhen) Company Limited, Shenzhen (CN)

(72) Inventor: Luxin Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 272 days.

(21) Appl. No.: 18/477,049

(22) Filed: Sep. 28, 2023

(65) Prior Publication Data

US 2024/0017170 A1 Jan. 18, 2024

Related U.S. Application Data

(63) Continuation of application No. PCT/CN2022/132468, filed on Nov. 17, 2022.

(30) Foreign Application Priority Data

Feb. 24, 2022 (CN) .......................... 202210178489.6

(51) Int. Cl.
*G06F 3/048* (2013.01)
*A63F 13/52* (2014.01)
(52) U.S. Cl.
CPC .................................. *A63F 13/52* (2014.09)
(58) Field of Classification Search
None
See application file for complete search history.

(56) References Cited

U.S. PATENT DOCUMENTS

| | | | |
|---|---|---|---|
| 8,659,598 B1 | 2/2014 | Norberg | |
| 2011/0265041 A1* | 10/2011 | Ganetakos | ............ A63F 13/533 |
| | | | 715/834 |
| 2017/0354893 A1* | 12/2017 | Benedetto | ............... A63F 13/63 |

FOREIGN PATENT DOCUMENTS

| | | |
|---|---|---|
| CN | 109248439 A | 1/2019 |
| CN | 111279394 A | 6/2020 |
| CN | 113082708 A | 7/2021 |
| CN | 113262490 A | 8/2021 |
| CN | 113908529 A | 1/2022 |
| CN | 113926195 A | 1/2022 |
| EP | 2 343 638 A2 | 7/2011 |

OTHER PUBLICATIONS

International Search Report for PCT/CN2022/132468 dated Feb. 11, 2023.

(Continued)

*Primary Examiner* — Lawrence S Galka
(74) *Attorney, Agent, or Firm* — Sughrue Mion, PLLC

(57) ABSTRACT

A method including displaying a virtual game scene in which a target virtual character in a virtual game is located in a display interface and in which target locations in the virtual game are set, determining relative position relationships between a character position of the target virtual character and target locations, and displaying, in a task prompting area at prompting positions corresponding to the relative position relationships, directional navigation icons corresponding to the target locations.

16 Claims, 11 Drawing Sheets

(56)　　　　　　　References Cited

OTHER PUBLICATIONS

Written Opinion for PCT/CN2022/132468 dated Feb. 11, 2023.
Communication from the Japanese Patent Office dated Dec. 9, 2025 in Application No. 2024-521833.
COD Mobile: Explanation of how to view the screen, [COD: Mobile] COD Mobile Iru Strategy Guide [online], Oct. 12, 2019, Retrieved from <URL:https://callofduty.jp/mobile/interface/>.
[For Beginners] COD Mobile Early Game Strategy!, [COD: Mobile] COD Mobile Strategy Guide [online], Oct. 24, 2019, Retrieved from <URL:https://callofduty.jp/mobile/beginners/>.
Communication issued Jan. 20, 2026 in CN Application No. 202210178489.6.

\* cited by examiner

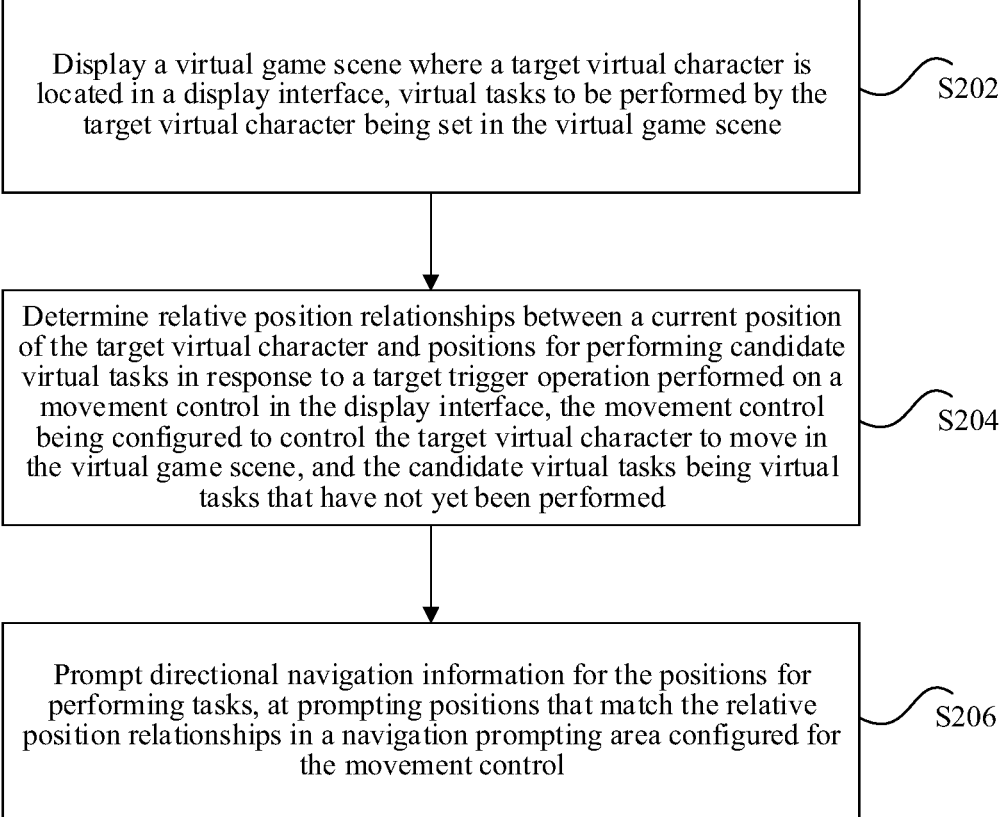

Display a virtual game scene where a target virtual character is located in a display interface, virtual tasks to be performed by the target virtual character being set in the virtual game scene    S202

Determine relative position relationships between a current position of the target virtual character and positions for performing candidate virtual tasks in response to a target trigger operation performed on a movement control in the display interface, the movement control being configured to control the target virtual character to move in the virtual game scene, and the candidate virtual tasks being virtual tasks that have not yet been performed    S204

Prompt directional navigation information for the positions for performing tasks, at prompting positions that match the relative position relationships in a navigation prompting area configured for the movement control    S206

FIG. 2

Apparatus for prompting a task

METHOD, APPARATUS, STORAGE MEDIUM, AND ELECTRONIC DEVICE FOR DISPLAYING DIRECTIONAL ICONS FOR PROMPTING TASK

CROSS REFERENCE TO RELATED APPLICATIONS

This application is a continuation application of International Application No. PCT/CN2022/132468 filed on Nov. 17, 2022, which claims priority to Chinese Patent Application No. 202210178489.6, filed with the China National Intellectual Property Administration on Feb. 24, 2022, the disclosures of each of which being incorporated by reference herein in their entireties.

FIELD

The disclosure relates to the field of computers, and specifically relates to a method and apparatus for prompting a task, a computer-readable storage medium, and an electronic device.

BACKGROUND

In many virtual game applications, players are often provided with many different interactive game tasks to complete throughout the game. The different interactive game tasks are often located at various positions in a virtual game scene provided by a virtual game application.

In related art virtual game applications, for interactive game tasks that are scattered at various positions, the players can only search by controlling virtual characters to blindly move in a virtual game scene. That is, for the interactive game tasks in a virtual game scene, only the description information of the task is provided in the related technology. If virtual characters controlled by players want to complete all the tasks one by one, the players to control the virtual characters need to constantly move and search for the positions for performing the tasks in a virtual game scene. In other words, task prompts provided by the related technology are relatively single in content, and the players need to control the virtual characters to blindly move and search for the tasks to be performed in the virtual game scene, resulting in poor game interactivity. Moreover, the playtime of the players is lengthened while the players blindly move and search for the tasks to be performed, wasting the power resource of a terminal and affecting the battery life of the terminal.

SUMMARY

Some embodiments provide a method for prompting a task, performed by an electronic device, including: displaying a virtual game scene in which a target virtual character in a virtual game is located in a display interface and in which target locations in the virtual game are set; determining relative position relationships between a character position of the target virtual character and target locations; and displaying, in a task prompting area at prompting positions corresponding to the relative position relationships, directional navigation icons corresponding to the target locations.

Some embodiments provide an apparatus for prompting a task including: at least one memory configured to store program code and at least one processor configured to read the program code and operate as instructed by the program code, the program code including: display code to cause at least one of the at least one processor display a virtual game scene in which a target virtual character in a virtual game is located in a display interface and in which target locations are set; determination code configured to cause at least one of the at least one processor to determine relative position relationships between a character position of the target virtual character and target locations; and prompting code configured to cause at least one of the at least one processor to display, in a task prompting area at prompting positions corresponding to the relative position relationships, directional navigation icons corresponding to the target locations.

Some embodiments provide a non-transitory computer-readable storage medium storing computer code which, when executed by at least one processor, causes the at least one processor to at least to perform the foregoing method.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

FIG. 2 is a flowchart of a method for prompting a task according to some embodiments.

DETAILED DESCRIPTION

Figure 1:
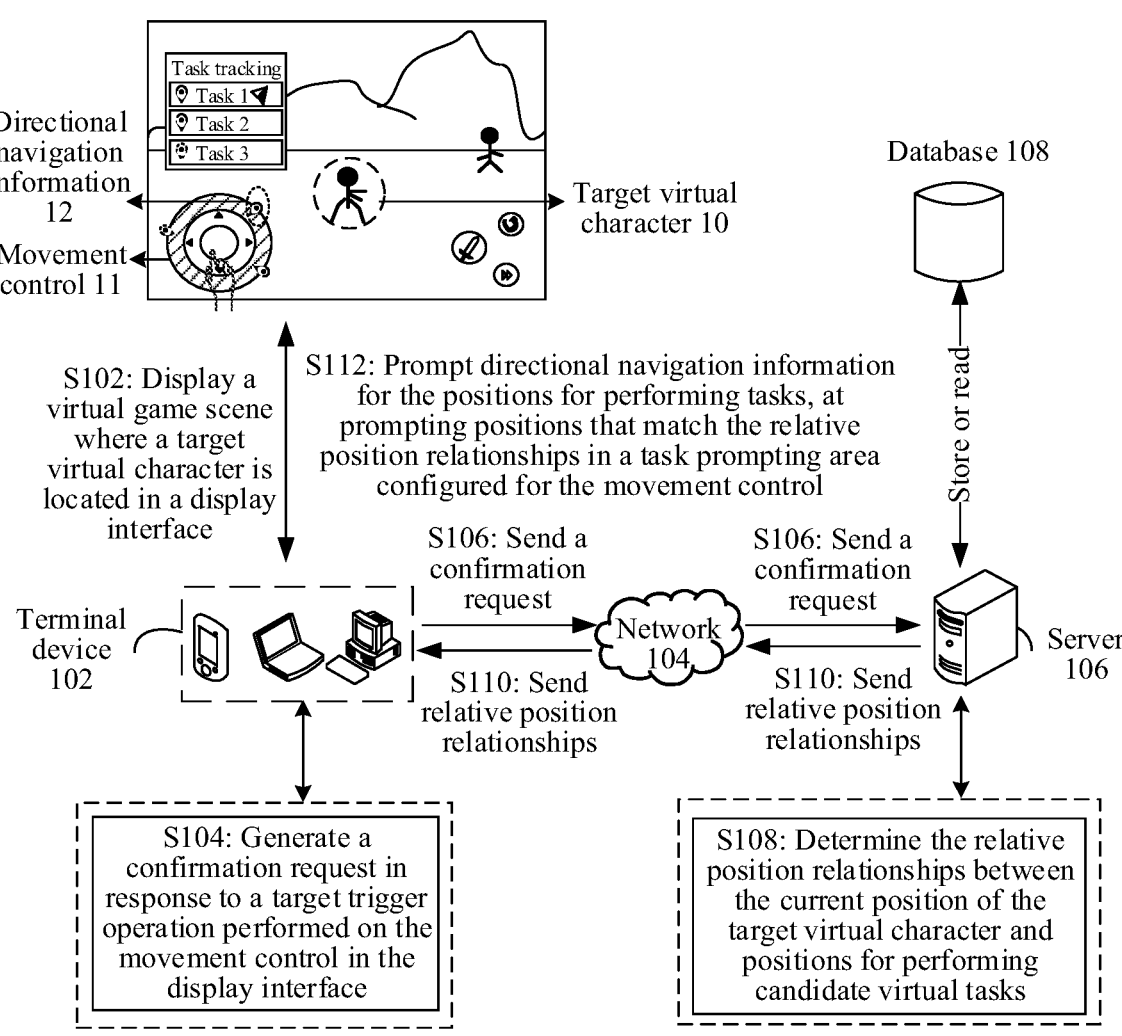
FIG. 1 is a schematic diagram of a hardware environment of a method for prompting a task according to some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure and the appended claims.

In the specification, claims, and the foregoing accompanying drawings of the disclosure, the terms "first", "second", and so on are intended to distinguish between similar objects rather than indicating a specific order or sequence. It is to be understood that such used data is interchangeable where appropriate so that the embodiments of the disclosure described herein can be implemented in an order other than those illustrated or described herein. Moreover, the terms "include", "be provided with" and any other variants mean to cover the non-exclusive inclusion, for example, a process, method, system, product, or device that includes a list of operations or units is not necessarily limited to those expressly listed operations or units, but may include other operations or units not expressly listed, or inherent to the process, method, product, or device.

In the following descriptions, related "some embodiments" describe a subset of all possible embodiments. However, it may be understood that the "some embodiments" may be the same subset or different subsets of all the possible embodiments, and may be combined with each other without conflict. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. For example, the phrase "at least one of A, B, and C" includes within its scope "only A", "only B", "only C", "A and B", "B and C", "A and C" and "all of A, B, and C."

In some embodiments, a method for prompting a task is provided. The method for prompting a task may be applied in, but not limited to, game terminal applications (APPs) where intended game tasks are completed in virtual scenes, e.g., Multiplayer Online Battle Arena (MOBA). The game tasks may be game tasks completed by the current player controlling a virtual character in a virtual scene through human-computer interactive operations and interacting with virtual characters controlled by other players. In some embodiments, the game tasks here may run in the form of plugins or mini programs in applications (e.g., non-standalone game APPs), or run in game engines in applications (e.g., standalone game APPs). The types of the foregoing game applications may include, but not limited to, at least one of: Two Dimensional (2D) game applications, Three Dimensional (3D) game applications, Virtual Reality (VR) game applications, Augmented Reality (AR) game applications, and Mixed Reality (MR) game applications. The foregoing is merely an example, and is not limited in any way in this embodiment.

In some embodiments, the method for prompting a task may be applied to a task prompting system in a hardware environment shown in FIG. 1, where the task prompting system may include a terminal device 102, a network 104, a server 106, and a database 108. A target client is run in the terminal device 102 (as shown in FIG. 1, the target client may be a game client). The terminal device 102 includes a human-computer interaction screen, a processor, and a memory. The human-computer interaction screen is configured to display a virtual game scene (as shown in FIG. 1, a virtual character is completing intended tasks in the virtual game scene), and is also configured to provide a human-computer interaction interface to receive human-computer interactive operations for controlling the controlled virtual character in the virtual game scene. The processor is configured to generate interactive instructions in response to the human-computer interactive operations and send the interactive instructions to the server. The memory is configured to store relevant attribute data, e.g., the attribute information of the controlled virtual character, the information of the candidate virtual tasks to be performed, and the relative position relationships between the controlled virtual character and the candidate virtual tasks. The character attribute information may include, but is not limited to, the identity for identifying the character and the current position thereof.

In some embodiments, the terminal device 102 may be a terminal device configured with a target client, and may include at least one of: a mobile phone (e.g., an Android mobile phone, and an iOS mobile phone), a laptop computer, a tablet computer, a palmtop computer, a Mobile Internet Device (MID), a PAD, a desktop computer, a smart TV, and the like. The target client may be a game client on which a game engine is run, or other application clients embedded with game plugins or game mini programs, e.g., an educational application client, and an instant messaging application client. In some embodiments, the network may include a wired network and a wireless network, where the wired network includes a local area network, a metropolitan area network, and a wide area network, and the wireless network includes Bluetooth, WIFI, and other networks for implementing wireless communication. The server may be a single server, a cluster of multiple servers, or a cloud server. The foregoing is merely an example, and is not limited in any way in this embodiment.

In some embodiments, the server 106 includes a processing engine, configured to perform storage or read operations on the database 108. In some embodiments, the processing engine reads the position of the target virtual character and the positions for performing the candidate virtual tasks to be performed in the virtual game scene from the database 108, and determines the relative position relationships between the target virtual character and the positions for performing tasks based on the information. The relative position relationships are returned to the terminal device 102, and directional navigation information for the positions for performing tasks is prompted based on the relative position relationships on a movement control configured to control the movement of the target virtual character in the terminal device 102.

In S102, display the virtual game scene where the target virtual character 10 is in the game client run in the terminal device 102. The virtual game scene includes virtual tasks to be performed by the virtual character. As shown in FIG. 1, the candidate virtual tasks to be performed include Task 1, Task 2, and Task 3.

In S104, generate a confirmation request in response to a target trigger operation performed on the movement control 11 in the display interface. In S106, send the confirmation request to the server 106 via the network 104. Based on the confirmation request, the server 106 pulls the position of the target virtual character and the positions for performing the virtual tasks from the database 108, and then determines the relative position relationships between the current position of the target virtual character and the positions for performing the candidate virtual tasks, as in S108. Then, the relative position relationships are sent to the terminal device 102 via the network 104.

The terminal device 102 prompts directional navigation information (a navigation positioning icon as shown in FIG. 1) for the positions for performing tasks, at prompting positions that match the relative position relationships in a navigation prompting area (the dotted line filled area corresponding to the movement control 11 in FIG. 1) configured for the movement control 11. In addition, as shown in FIG. 1, a task list containing multiple candidate virtual tasks may be displayed at the top left corner of the display interface.

In some embodiments, in a case that the terminal device 102 has high computational processing power, the S108 may also be performed by the terminal device 102.

In some embodiment, the virtual game scene where the target virtual character is located is displayed in the display interface, and the relative position relationships between a current position of the target virtual character and the positions for performing the candidate virtual tasks are determined in response to a target trigger operation performed on the movement control presented in the display interface, where the movement control is configured to control the target virtual character to move in the virtual game scene, and the candidate virtual tasks are virtual tasks that have not yet been performed. Directional navigation information for the positions for performing tasks is prompted at prompting positions that match the relative position relationships in the task prompting area configured for the movement control. That is, the prompting function of the existing movement control is extended in the display interface where the virtual game scene is displayed. The directional navigation information for the candidate virtual tasks that have not yet been completed is prompted in the navigation prompting area configured for the movement control, and the virtual character needs not to continuously and blindly move and search for the positions for performing the tasks in the virtual game scene. Also, configuration and display of additional controls in the virtual game scene for achieving directional navigation of tasks are not needed, numerous jumbled information required to be displayed in the scene is simplified, and obstruction is reduced on the virtual game scene. Moreover, the directional navigation information of the positions for performing tasks is integrated in the movement control configured to control the movement of the target virtual character, such that the information that players need to pay attention to when controlling the target virtual character to perform tasks is centrally displayed, the originally separated cognitive positions of the eyes and hands are centralized and unified, and the reaction time of the players is saved. Multiple interactive operations in the related technologies may be replaced by only one interactive operation on the movement control to achieve the purpose of moving the virtual character and searching for the tasks to be performed, thereby improving the interactive experience of the players in games. Therefore, the task prompt content is expanded and enriched by the movement control, the interactive effect is improved, and the problem of poor game interactivity caused by the relatively single task prompt content provided by the related technologies is overcome. The virtual character needs not to continuously and blindly move and search for the positions for performing the tasks in the virtual game scene, and the playtime of the players may be shortened, thereby saving the power resource of a terminal and prolonging the battery life of the terminal.

In some embodiments, as shown in FIG. 2, the method for prompting a task includes the following operations:

S202: Display a virtual game scene where a target virtual character is located in a display interface, where virtual tasks to be performed by the target virtual character are set in the virtual game scene.

In some embodiments, the virtual game scene may be a fictional 3D scene provided by a game application client. Virtual environmental landscapes, e.g., virtual buildings or pavilions, virtual rivers and lakes, virtual villages or towns, and the like, constructed by imitating the environmental landscapes in real scenes are set in the virtual game scene. Thus, players can complete various pre-configured virtual tasks in the scene by controlling virtual characters as their avatars to perform different operations in the game application client, and then receive virtual rewards corresponding to the virtual tasks after completing the virtual tasks.

The virtual tasks may include, but not limited to: 1) Tasks performed by the target virtual character interacting with the virtual environmental landscapes set in the virtual game scene to achieve intended goals. In some embodiments, a virtual task may require the target virtual character to draw water from a virtual well until N water tanks are filled. A virtual task may involve the target virtual character acquiring a virtual transportation vehicle to cross the current river and reach the opposite bank. In some embodiments, a virtual task may require the target virtual character to arrive at a position where the target virtual character participates in a performance, and the like. 2) Tasks performed by the target virtual character interacting with virtual characters controlled by other players in the virtual game scene to achieve intended goals. For example, a virtual task may involve the target virtual character and other virtual characters attacking each other until the target virtual character kills all the other virtual characters. The virtual characters may be, but not limited to, avatars of the players controlled by the game client in the virtual game scene, e.g., virtual human characters, virtual animal characters, and virtual cartoon characters.

S204: Determine relative position relationships between a current position of the target virtual character and positions for performing candidate virtual tasks in response to a target trigger operation performed on a movement control in the display interface, where the movement control is configured to control the target virtual character to move in the virtual game scene, and the candidate virtual tasks are virtual tasks that have not yet been performed.

In some embodiments, the movement control may be a user interface control configured at the game client and presented in the display interface, and the user interface control is configured to trigger the corresponding function of the control based on a trigger operation performed on the control. The user interface control may have, in some embodiments, different presentation forms, e.g., a universal wheel, a touch button, and a slideway. The trigger operation may include, for example, click, a swipe, multiple consecutive clicks, continuous pressing up to a certain time threshold, and the like. The trigger operation is not limited herein. Taking the original configuration function of the foregoing movement control as an example, in a case that a swiping operation triggered on the movement control is detected, the direction of a touch point swiping on the movement control is determined, for example, in a case that the touch point is swiped to the true north, the virtual character is controlled to move towards the true north.

In some embodiments, the target trigger operation performed on the movement control is to trigger a new function configured for the movement control, that is, to provide navigation prompts for the directions of virtual tasks that have not yet been performed. The target trigger operation may be, but is not limited to, one clicking operation, two consecutive clicking operations, and continuous pressing up to a certain time threshold (i.e., long pressing). In a case that the target trigger operation performed on the movement control is detected, the new function is triggered. For example, in a case that the target trigger operation is detected, the task prompting area configured for the movement control is called and displayed at the position where the movement control is, and the directional navigation information for the virtual tasks that have not yet been performed is prompted in the corresponding position in the task prompting area.

The relative position relationships between the current position of the target virtual character and the positions for performing the candidate virtual tasks may be, but not limited to, the respective relative position relationships between the target virtual character and the candidate virtual tasks that have not yet been performed currently. The relative position relationships may include, but not limited to, relative direction relationships, and relative distance relationships.

For example, assuming that the candidate virtual tasks include Task 1, Task 2, and Task 3 as shown in FIG. 1, the relative position relationships between the target virtual character 10 and the tasks are determined in response to a target trigger operation performed on the movement control on the display interface. In a case that Task 1 is located in the northeast of the target virtual character, directional navigation information 12 for Task 1 is displayed in the northeast relative to the center of a circle (where the target virtual character is located) in the task prompting area corresponding to the movement control 11. In a case that Task 2 is located in the southeast of the target virtual character, directional navigation information 12 for Task 2 is displayed in the southeast relative to the center of a circle (where the target virtual character is located) in the task prompting area corresponding to the movement control 11. The foregoing is merely an example, and is not limited thereto.

S206: Prompt directional navigation information for the positions for performing tasks, at prompting positions that match the relative position relationships in a task prompting area configured for the movement control.

In some embodiments, the task prompting area configured for the movement control may be an outer ring area where the movement control is, or an area near the outer boundary of the movement control. In some embodiments, the task prompting area may be concentric with the display area where the movement control is, or may be outside the display area where the movement control is.

In some embodiments, the directional navigation information may include, but not limited to, a navigation positioning icon, a navigation prompting text, a special navigation prompting effect, and other information for indicating the direction of task performance. Taking the special navigation prompting effect as an example, a dynamic special effect configured for the virtual tasks is prompted in the task prompting area. The style and manner for prompting the directional navigation information are not limited herein.

Figure 3:
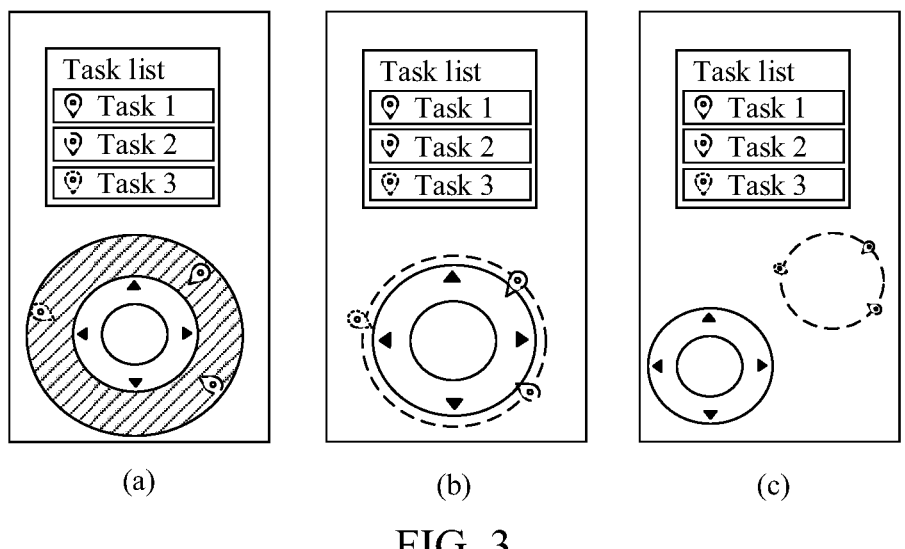
FIG. 3 is a schematic diagram of a method for prompting a task according to some embodiments.

For example, the task prompting area configured for the movement control may include one of the following as shown in FIG. 3: 1) the task prompting area may be an outer ring area where the movement control is, i.e., a diagonal filled area as shown in FIG. 3 (*a*); 2) the task prompting area may be a line area near the outer boundary of the movement control, i.e., a dashed line area as shown in FIG. 3 (*b*); and 3) the task prompting area may be outside the display area where the movement control is, i.e., a dashed line area as shown in FIG. 3 (*c*). The content shown in FIG. 3 is an example. Directional navigation information corresponding to the positions for performing the virtual tasks to be performed may be displayed at the corresponding prompting positions, and the prompting positions may be within the task prompting area (the diagonal filled area as shown in FIG. 3 (*a*)), or near the task prompting area. The prompting positions are not limited in any way herein.

Figure 4:
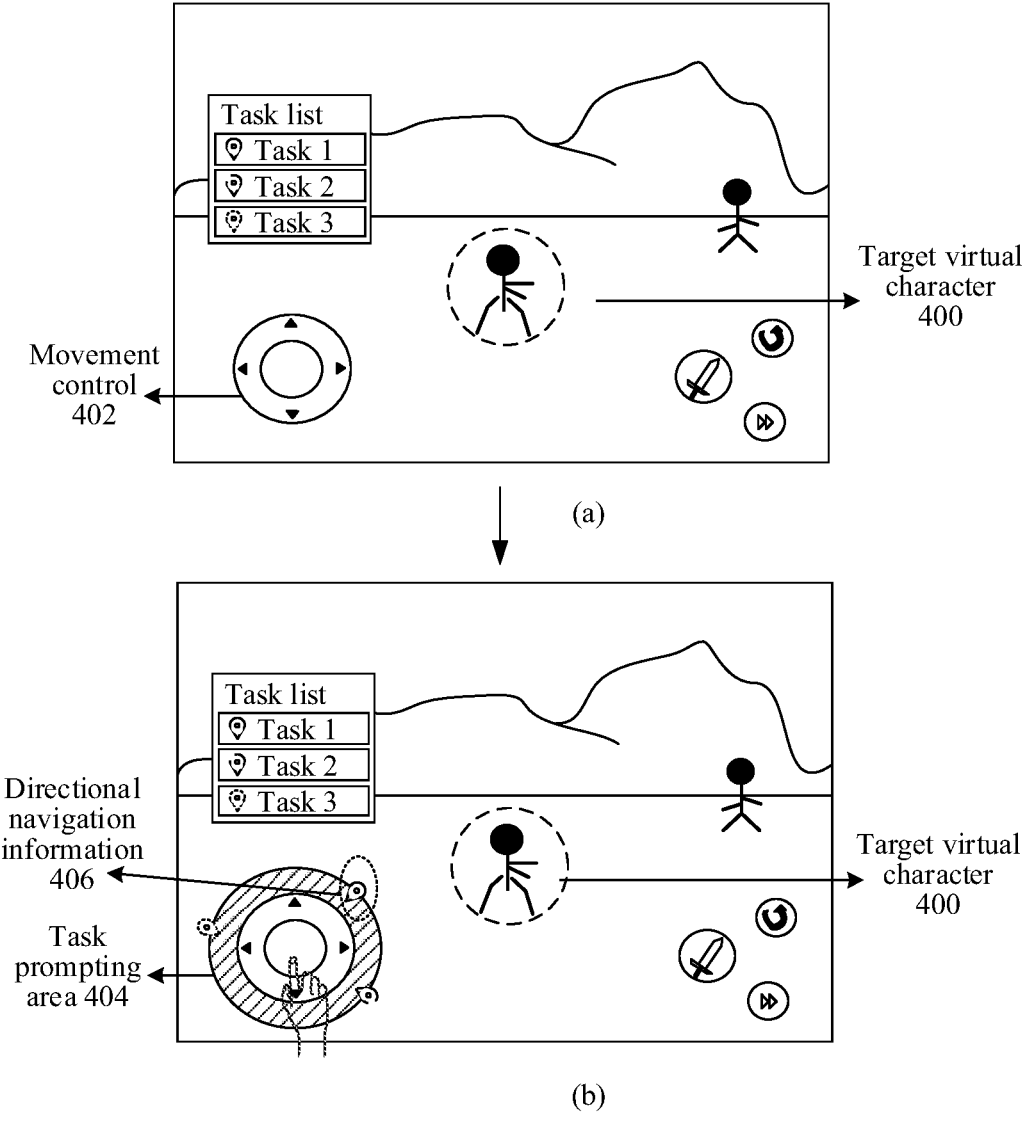
FIG. 4 is a schematic diagram of a method for prompting a task according to some embodiments.

FIG. 4 is a schematic diagram of a method for prompting a task according to some embodiments. Referring to FIG. 4, a virtual game scene where a target virtual character is located is displayed in a display interface, and the scene image is as shown in FIG. 4 (*a*). Virtual tasks to be performed by the virtual character are set in the virtual game scene, and a task list as shown in FIG. 4 (*a*) includes the candidate virtual tasks that have not yet been performed, i.e., Task 1, Task 2, and Task 3. A target virtual character 400 controlled by the current client is located in the virtual game scene.

The relative position relationships between the respective positions for performing the tasks and the current position of the target virtual character are determined in response to a target trigger operation performed on a movement control 402 configured to control the target virtual character 400 to move. Then, directional navigation information 406 for the positions for performing tasks is prompted at prompting positions that match the relative position relationships in the task prompting area 404 (the diagonal filled ring area as shown in FIG. 4 (*b*)) configured for the movement control. In a case that the position for performing Task 1 is in the northeast of the current position of the target virtual character 400, directional navigation information (a solid line navigation positioning icon as shown in FIG. 4 (*b*)) for Task 1 is displayed in the northeast relative to the center of a circle (the current position of the target virtual character 400) in the task prompting area. In a case that the position for performing Task 2 is in the southeast of the current position of the target virtual character 400, directional navigation information (a line-segment navigation positioning icon as shown in FIG. 4 (*b*)) for Task 2 is displayed in the southeast relative to the center of the target virtual character 400) in the task prompting area. In a case that the position for performing Task 3 is in the northwest of the current position of the target virtual character 400, directional navigation information (a dotted line navigation positioning icon as shown in FIG. 4 (*b*)) for Task 3 is displayed in the northwest relative to the center of a circle (the current position of the target virtual character 400) in the task prompting area.

FIG. 4 is merely an example embodiment, and the prompting style of the task prompting area, the presentation form of the directional navigation information, and the like involved in the method for prompting a task are not limited thereto.

By this embodiment, the prompting function of the existing movement control is extended in the display interface where the virtual game scene is displayed. The directional navigation information for the candidate virtual tasks that have not yet been completed is prompted in the navigation prompting area configured for the movement control, and the virtual character needs not to continuously and blindly move and search for the positions for performing the tasks in the virtual game scene. Therefore, the task prompt content is expanded and enriched by the movement control, the interactive effect is improved, and the problem of poor game interactivity caused by the relatively single task prompt content provided by the related technologies is overcome.

In some embodiments, the determining relative position relationships between a current position of the target virtual character and positions for performing candidate virtual tasks includes:

S1: Determine a current orientation of the target virtual character at the character position; and S2: Determine the relative position relationships based on the character orientation.

The relative position relationships between the target virtual character and the positions for performing the candidate virtual tasks may be determined based on, but not limited to, the orientation and position of the target virtual character. That is, in a case that the orientation of the target virtual character changes, but the character position remains unchanged, the relative position relationships between the positions for performing tasks and the target virtual character actually changes accordingly. Therefore, in some embodiments, the orientation of the target virtual character at the character position may be, but not limited to, determined first. Then the positions for performing tasks are obtained based on the character orientation, and the relative position relationships between the character position and the positions for performing tasks are determined in a coordinate system corresponding to the character orientation. Further, directional navigation information that matches the character orientation is prompted in the task prompting area of the movement control.

For example, in some embodiments, assuming that in the original coordinate system of the task prompting area, "north" in the virtual game scene corresponds to the "top" of the movement control, in a case that the target virtual character is facing the "north" of the virtual game scene, if a candidate virtual task A appears at the east of the target virtual character in the virtual game scene, then directional navigation information for the candidate virtual task A is displayed at the "right" of the movement control corresponding to the "east" of the scene in the task prompting area. In a case that the target virtual character adjusts the orientation to the "east" of the virtual game scene, the display coordinate system of the task prompting area is also adjusted accordingly, that is, the "east" in the scene corresponds to the "top" of the movement control, and then the directional navigation information for the candidate virtual task A is displayed at the "top" of the task prompting area accordingly.

By this embodiment, the relative position relationships are determined based on the character orientation after the current orientation of the target virtual character at the character position is determined. Therefore, accurate directional navigation information for the positions for performing tasks is prompted based on the current orientation of the target virtual character, and the accuracy of task prompts is improved.

In some embodiments, after prompting directional navigation information for the positions for performing tasks, at prompting positions that match the relative position relationships in a task prompting area configured for the movement control, the following operations are included:

S1: Adjust a first relative position relationship corresponding to a first orientation to a second relative position relationship corresponding to a second orientation in a case that the orientation of the target virtual character is adjusted from the first orientation to the second orientation; and S2: Adjust the directional navigation information for the positions for performing tasks displayed in the task prompting area from a first prompting position corresponding to the first relative relationship to a second prompting position corresponding to the second relative position relationship.

Figure 5:
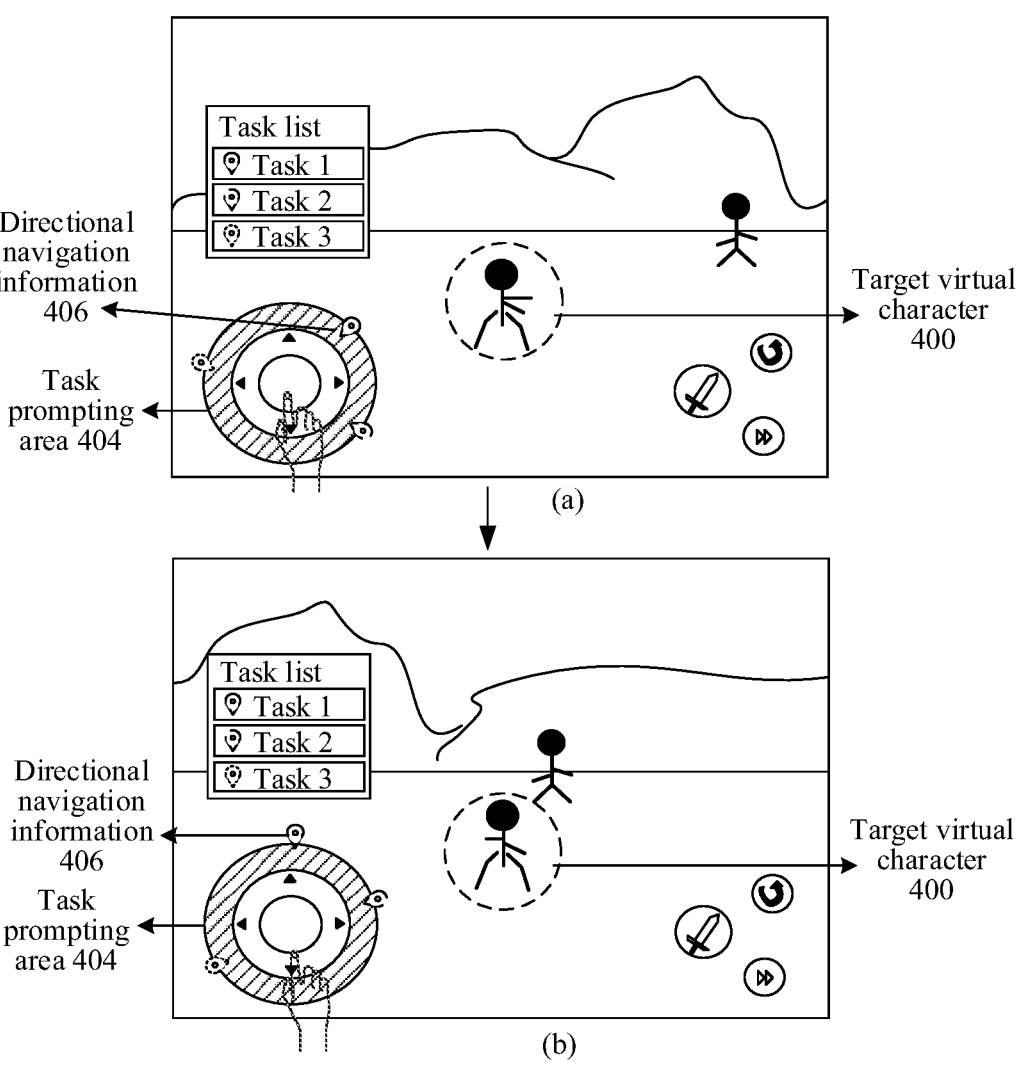
FIG. 5 is a schematic diagram of a method for prompting a task according to some embodiments.

FIG. 5 is a schematic diagram of a method for prompting a task according to some embodiments. Referring to FIG. 5, a virtual game scene where a target virtual character is located is displayed in a display interface. Assuming that virtual tasks to be performed by the virtual character are set in the virtual game scene, a task list as shown in FIG. 5 (a) includes the candidate virtual tasks that have not yet been performed, i.e., Task 1, Task 2, and Task 3. A target virtual character 400 controlled by the current client is located in the virtual game scene, and the current orientation is the first orientation. Correspondingly, directional navigation information for the positions for performing tasks is displayed in a task prompting area 404 (a diagonal filled area as shown in the figure) of a movement control. As shown in FIG. 5 (a), the task position for performing Task 1 is in the northeast of the current orientation of the target virtual character, and the directional navigation information is displayed at a prompting position in the northeast area of the task prompting area; the task position for performing Task 2 is in the southeast of the current orientation of the target virtual character, and the directional navigation information is displayed at a prompting position in the southeast area of the task prompting area; and the task position for performing Task 3 is in the northwest of the current orientation of the target virtual character, and the directional navigation information is displayed at a prompting position in the northwest area of the task prompting area.

Further, in a case that the current orientation of the target virtual character 400 is adjusted from the first orientation to the second orientation, the directional navigation information for the positions for performing tasks in the task prompting area 404 (the diagonal filled area as shown in the figure) of the movement control is also adjusted accordingly. As shown in FIG. 5 (b), the directional navigation information for the positions for performing Task 1 to Task 3 in the task prompting area is also adjusted accordingly.

By this embodiment, the positions for performing the candidate virtual tasks prompted in the task prompting area may be flexibly adjusted based on the orientation of the target virtual character, ensuring the accuracy of the prompting information presented to a user, and facilitating guidance of the target virtual character to accurately and quickly navigate to the positions for performing tasks to complete the candidate virtual tasks.

In some embodiments, the prompting directional navigation information for the positions for performing tasks, at prompting positions that match the relative position relationships in a task prompting area configured for the movement control includes:

S1: Display navigation positioning icons representing directional navigation information at the prompting positions in the task prompting area configured on the outer boundary of the movement control; and S2: Display a task list in the display interface in areas other than the display area where the movement control is located, where the task list includes description information of the candidate virtual tasks and navigation positioning icons matching the candidate virtual tasks.

In some embodiments, the navigation positioning icons may include, but not limited to, prompting based on at least one of the following: prompting the relative position relationships between the positions for performing tasks and the target virtual character based on the positions of the icons in the task prompting area; and prompting the relative position relationships between the positions for performing tasks and the target virtual character based on the pointing directions of the icons.

Figures 6, 7:
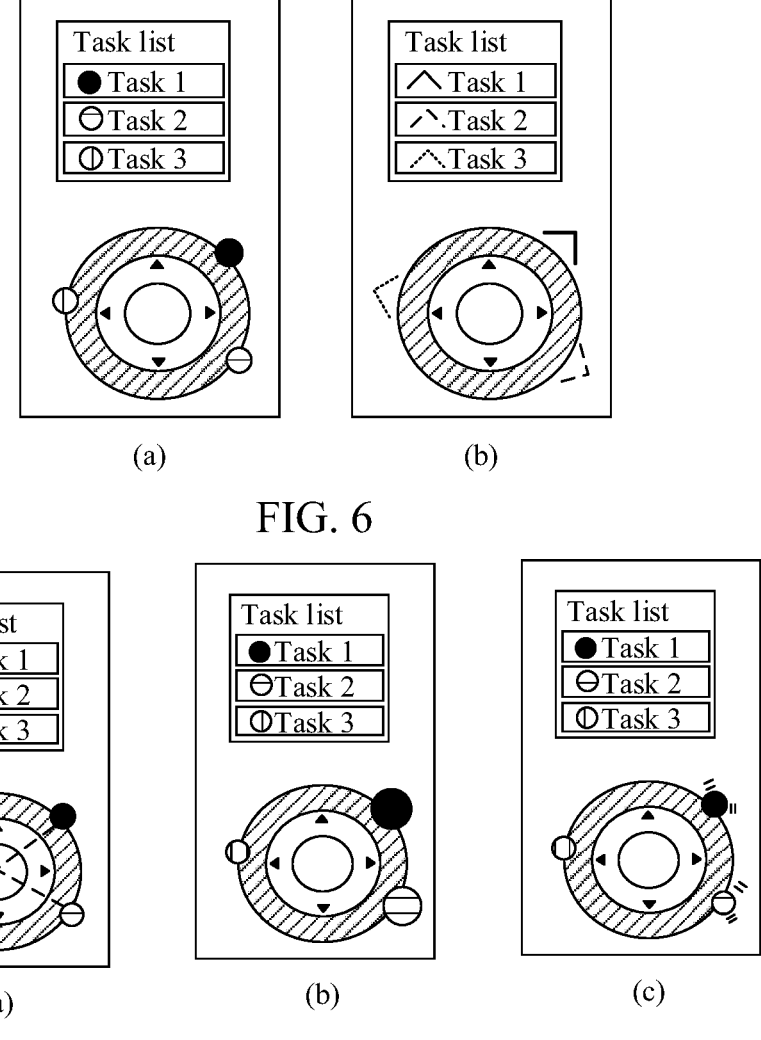
FIG. 6 is a schematic diagram of a method for prompting a task according to some embodiments.
FIG. 7 is a schematic diagram of a method for prompting a task according to some embodiments.

In some embodiments, as shown in FIG. 6 (a), the positions of the navigation positioning icons (circles with different types of filling corresponding to different tasks) in the task prompting area prompt the relative position relationships between the positions for performing tasks and the target virtual character. As shown in FIG. 6 (b), the pointing directions of the navigation positioning icons (angles with different types of lines corresponding to different tasks) prompt the relative position relationships between the positions for performing tasks and the target virtual character.

Moreover, in some embodiments, the task list may also be, but not limited to, displayed in the display interface, where the task list may include, but not limited to, task description information and examples of navigation positioning icons that match the tasks. The task description information here may indicate the attribute content, e.g., the name, ID, and type of the task, to distinguish the task from other tasks.

In some embodiments, as shown in FIG. 6 (a), a task list is displayed, where circles with different types of filling are used for indicating different tasks, e.g., a navigation positioning icon corresponding to Task 1 may be a solid circle, a navigation positioning icon corresponding to Task 2 may be a circle filled with horizontal lines, and a navigation positioning icon corresponding to Task 3 may be a circle filled with vertical lines. The positions of different circles in the task prompting area (the diagonal filled area) configured for the movement control prompt the relative position relationships between the positions for performing tasks and the target virtual character, so that the target virtual character may quickly and accurately move according to the prompting information until reaching the positions for performing tasks.

As shown in FIG. 6 (b), a task list is displayed, where angles with different types of lines are used for indicating different tasks, e.g., a navigation positioning icon corresponding to Task 1 may be a solid line angle, a navigation positioning icon corresponding to Task 2 may be a line-segment angle, and a navigation positioning icon corresponding to Task 3 may be a dotted line angle. The pointing directions of different angles prompt the relative position relationships between the positions for performing tasks and the target virtual character, so that the target virtual character may quickly and accurately move according to the prompting information until reaching the positions for performing tasks.

By this embodiment, the navigation positioning icons matching the candidate virtual tasks are displayed at the prompting positions in the task prompting area, thereby intuitively prompting the positions for performing tasks, saving the display space of the display interface, and preventing other displayed elements from obstructing the display interface.

In some embodiments, the displaying the navigation positioning icons representing the directional navigation information includes:

S1: Obtain distances between the character position and the positions for performing tasks; and S2: Display the navigation positioning icons based on display transparency that matches the distance, where the farther the distance, the lower the corresponding display transparency.

In some embodiments, in a case that the navigation positioning icons are prompted in the task prompting area, the display transparency of the navigation prompt icons may also be used for indicating the distances between the candidate virtual tasks and the current position of the target virtual character. The farther away from the target virtual character, the lower the display transparency of a navigation positioning icon, and the less visual prompting information presented. That is, the closer to the target virtual character, the clearer the display of a navigation positioning icon.

By this embodiment, not only may the navigation positioning icons be used in the task prompting area to prompt the direction of the positions for performing the candidate virtual tasks relative to the position of the target virtual character, but also the relative distance between the positions for performing tasks and the character position may be prompted by adjusting the display transparency of the navigation positioning icons. Thus, the content of task prompts is enriched and detailed, facilitating a player to make decisions to move to a more suitable position for performing a candidate virtual task, and improving the task performing efficiency.

In some embodiments, during prompting the directional navigation information for the positions for performing tasks, the following operations are also included:

S1: Obtain the connected state from the character position to the positions for performing tasks; and S2: Display a movement prompting marker for prompting allowance to move in a case that the connected state indicates that the target virtual character is allowed to move from the character position to the positions for performing tasks.

In some embodiments, whether the character position is in a connected state to the position for performing a task may refer to, but not limited to: after the positions for performing the candidate virtual tasks are obtained, in this embodiment, whether the target virtual character may move from the current position to the positions for performing tasks is determined by a navigation path algorithm. The marker for prompting the connected state may include, but not limited to: a connecting line from the center position of the movement control to the directional navigation information, prominent display of the directional navigation information, and a dynamic special effect on the directional navigation information.

For example, in some embodiments as shown in FIG. 7 (a), there are connecting lines between the directional navigation information of Task 1 and Task 2 and the center position of the movement control, indicating that the target virtual character can move from the character position to the positions for performing Task 1 and Task 2; while there is no connecting line between the directional navigation information of Task 3 and the center position of the movement control, indicating that the target virtual character cannot move from the character position to the position for performing Task 3.

For example, in some embodiments as shown in FIG. 7 (b), the directional navigation information of Task 1 and Task 2 is enlarged for prominent display, indicating that the target virtual character can move from the character position to the positions for performing Task 1 and Task 2; while the directional navigation information of Task 3 is not enlarged for prominent display, indicating that the target virtual character cannot move from the character position to the position for performing Task 3.

For example, in some embodiments as shown in FIG. 7 (c), the directional navigation information of Task 1 and Task 2 jiggles, indicating that the target virtual character can move from the character position to the positions for performing Task 1 and Task 2; while the directional navigation information of Task 3 does not jiggle, indicating that the target virtual character cannot move from the character position to the position for performing Task 3.

By this embodiment, in a case that the connected state indicates that the target virtual character is allowed to move from the character position to a position for performing a task, the movement prompting marker is displayed to prompt the target virtual character to move to the corresponding position for performing a task, facilitating a player to quickly decide the order for performing tasks and quickly move to the corresponding position for performing a task, and saving the task performing time.

In some embodiments, after prompting the directional navigation information for the positions for performing tasks, the following operations are also included:

S1: Determine target virtual tasks to be performed by the target virtual character from the task prompting area in response to a swiping operation performed on the movement control; and S2: Control the target virtual character to automatically move from the character position to the positions for performing the target tasks under an automatic navigation state in a case that the movement conditions are met between the position of the target virtual character and the positions for performing the target virtual tasks.

In some embodiments, the task prompting area is called and displayed in response to a target trigger operation performed on the movement control, and the task prompting area includes directional navigation information corresponding to the positions for performing the candidate virtual tasks. Further, the target directional navigation information is selected from the directional navigation information at the prompting positions in the task prompting area in response to a swiping operation performed on the movement control, thereby determining the target virtual tasks to be performed. In a case that the target virtual task meets the movement conditions, the target virtual character is triggered to directly enter the automatic navigation state, and the destination of the automatic navigation process is the corresponding position for performing the target virtual task.

That is, in some embodiments, the target directional navigation information in the task prompting area not only has the function of prompting the direction, but also can trigger the automatic navigation function for the target virtual character, so that the target virtual character can automatically move to the position for performing the target task where the selected target virtual human character is located. A user needs not to constantly operate the movement control, the operation for performing a task is simplified, and the efficiency in performing the candidate virtual tasks is improved.

For example, in some embodiments, after the target directional navigation information for the target virtual task is selected for the target virtual character, it is determined that the target virtual character enters the automatic navigation state, and an automatic navigation path computational process is initiated for the target virtual character. The backend will compute a movement path to the position for performing the target task based on real-time changes in the position of the target virtual character, and control the target virtual character to automatically move to the position for performing the target task according to the movement path.

In some embodiments, the movement conditions may be that, but not limited to, the connected state indicates that the target virtual character is allowed to move from the character position to the position for performing a task. In this way, in a case that the position for performing the target task meets the movement conditions, the target virtual character is controlled to directly enter the automatic navigation state, and automatically navigate to the position for performing the selected target virtual task.

By this embodiment, in a case that the target virtual task is selected from the task prompting area, the process of automatically navigating to the position for performing the target virtual task is triggered for the target virtual character. Thus, without the need for continuous operation on the movement control, the target virtual character can automatically move to the position for performing the target virtual task to quickly complete the virtual task that has not yet been performed, simplifying the operation for controlling the virtual character to perform the task, and improving the task performing efficiency.

In some embodiments, the determining target virtual tasks to be performed by the target virtual character from the task prompting area in response to a swiping operation performed on the movement control includes:

S1: Determine an endpoint position of the trajectory of a swiping operation in response to the swiping operation;

S2: Hit the target directional navigation information on the target prompting position corresponding to the target virtual task in the task prompting area at the endpoint position; and S3: Prominently display the target directional navigation information corresponding to the target virtual task.

Figure 8:
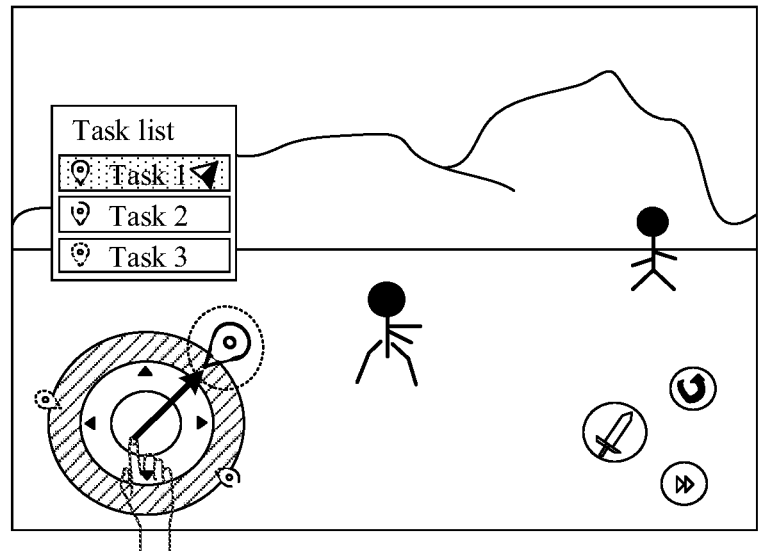
FIG. 8 is a schematic diagram of a method for prompting a task according to some embodiments.

FIG. 8 is a schematic diagram of a method for prompting a task according to some embodiments. Referring to FIG. 8, a virtual game scene where a target virtual character is located is displayed in a display interface. Assuming that virtual tasks to be performed by the virtual character are set in the virtual game scene, a task list as shown in FIG. 8 includes the candidate virtual tasks that have not yet been performed, i.e., Task 1, Task 2, and Task 3.

The endpoint position of the trajectory of a swiping operation is determined in response to the swiping operation. Assuming that the endpoint position hits (i.e., reaches or contacts) the target directional navigation information on the target prompting position corresponding to the target virtual task in the task prompting area, for example, as shown in FIG. 8, the swiping operation hits the directional navigation information corresponding to Task 1, the directional navigation information corresponding to Task 1 is determined as the target directional navigation information and prominently displayed. As shown in FIG. 8, the target directional navigation information is enlarged for prominent display.

The target directional navigation information here is prominently displayed not limited to the foregoing example, but may also be, but not limited to, highlighted, jiggled, and so on, which is not limited here.

In some embodiments, as shown in FIG. 8, the entry corresponding to Task 1 in the task list is also prominently displayed (dot filled as shown in the figure), and a navigation prompt icon is displayed in the entry corresponding to Task 1 to indicate that the target virtual character is about to enter the automatic navigation state and automatically navigate to the position for performing Task 1.

In some embodiments, the function of the movement control may also be, but not limited to, retained. After the task prompting area is displayed, in a case that the endpoint position of a swiping operation does not hit the directional navigation information corresponding to any candidate virtual task, the target virtual character is controlled to move according to the indication for the endpoint position of the swiping operation on the movement control, that is, the movement control function of the movement control is retained.

Figure 9:
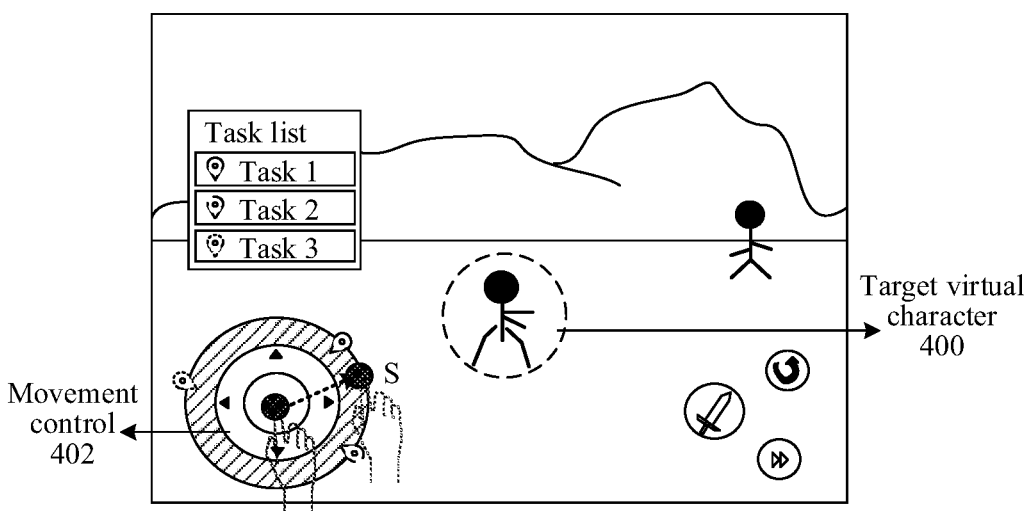
FIG. 9 is a schematic diagram of a method for prompting a task according to some embodiments.

FIG. 9 is a schematic diagram of a method for prompting a task according to some embodiments: Taking the foregoing assumed scenario as an example, assuming that the endpoint position of a swiping operation stops at the position S of the black solid circle shown in FIG. 9, it indicates that the endpoint position of the swiping operation does not hit the directional navigation information corresponding to any candidate virtual task. Then, the target virtual character 400 may move according to the direction indicated by the position S, the movement control function of the mobile movement 402 is implemented, while the tasks in the task list displayed remain unchanged.

In some embodiments, the task prompting area may, but not limited to, prompt directional navigation information for one type of candidate virtual tasks, and may also, but not limited to, simultaneously prompt directional navigation information for multiple types of candidate virtual tasks, thereby achieving diversity of prompts and facilitating decision-making on the current task to be performed and the current destination.

Figure 10:
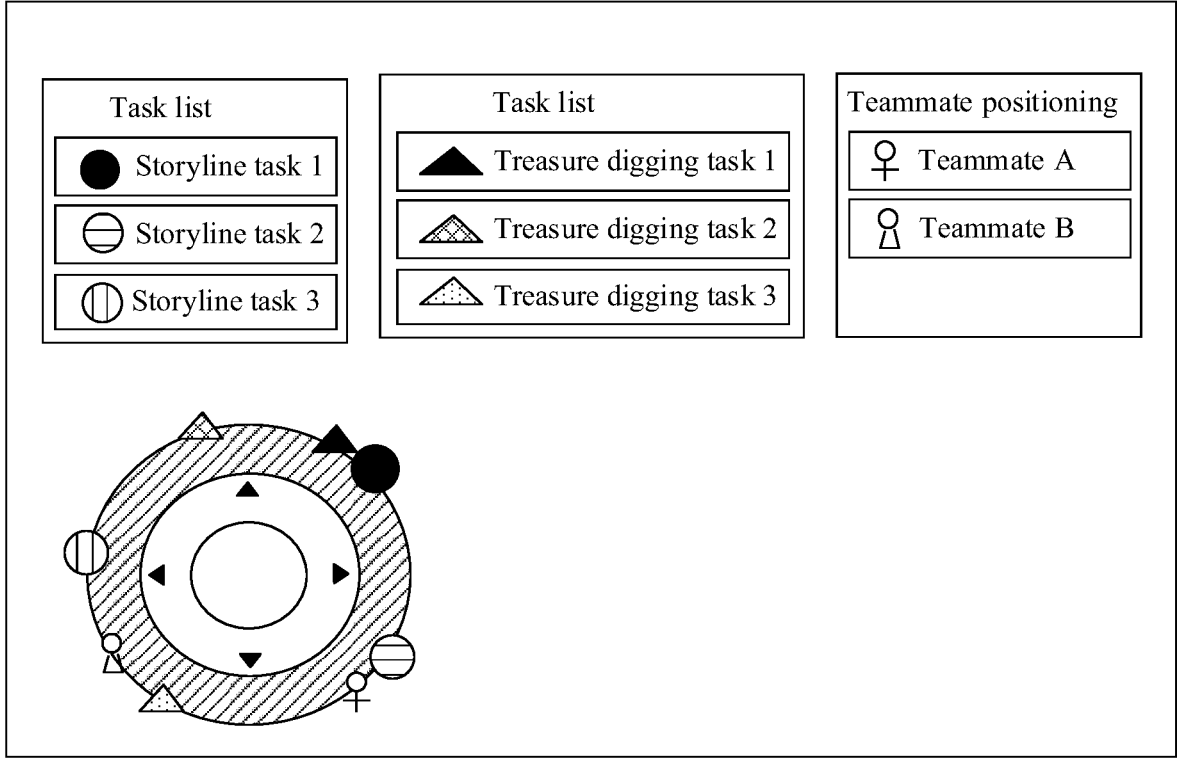
FIG. 10 is a schematic diagram of a method for prompting a task according to some embodiments.

FIG. 10 is a schematic diagram of a method for prompting a task according to some embodiments. In some embodiments, the multiple types of candidate virtual tasks include storyline tasks, treasure digging tasks, and teammate prompted tasks. The storyline tasks include Storyline Task 1 (using a solid circle as a navigation positioning icon as shown in FIG. 10), Storyline Task 2 (using a circle filled with horizontal lines as a navigation positioning icon as shown in FIG. 10), and Storyline Task 3 (using a circle filled with vertical lines as a navigation positioning icon as shown in FIG. 10). The treasure digging tasks include Treasure Digging Task 1 (using a solid triangle as a navigation positioning icon as shown in FIG. 10), Treasure Digging Task 2 (using a triangle filled with meshes as a navigation positioning icon as shown in FIG. 10), and Treasure Digging Task 3 (using a triangle filled with points as a navigation positioning icon as shown in FIG. 10). The teammate prompted tasks include: position prompt of a teammate A (a navigation positioning icon as shown in FIG. 10), and position prompt of a teammate B (a navigation positioning icon as shown in FIG. 10). The prompt effect may be as shown in FIG. 10. Different task types correspond to different directional navigation information (taking the navigation positioning icons as an example). Even if there is obstruction during display, the relative position relationships between the positions for performing the tasks and the target virtual character may not be affected.

By this embodiment, in a case that the target directional navigation information on the target prompting position corresponding to the target virtual task in the target virtual task prompting area is hit at the endpoint position, the target directional navigation information corresponding to the target virtual task is prominently displayed. In a case that no directional navigation information is hit, the target virtual character is controlled to move according to the current position indicated by the movement control to continue using the movement control function of the movement control.

In some embodiments, the controlling the target virtual character to automatically move from the character position to the positions for performing the target tasks under an automatic navigation state includes:

S1: Display the target directional navigation information in the center of the movement control, and hide the directional navigation information corresponding to the candidate virtual tasks other than the target virtual task in the task prompting area.

Figure 11:
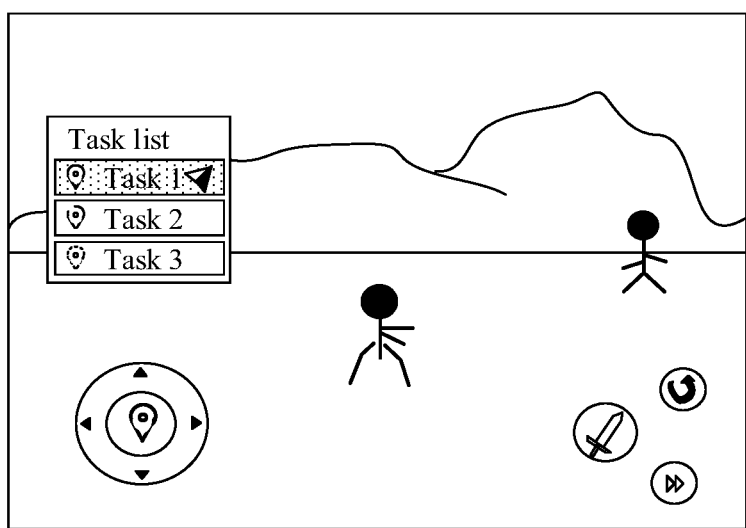
FIG. 11 is a schematic diagram of a method for prompting a task according to some embodiments.

FIG. 11 is a schematic diagram of a method for prompting a task according to some embodiments. In some embodiments, the target virtual task selected by a swiping operation is Task 1, the directional navigation information corresponding to Task 1 may be displayed in the center of the movement control, and other directional navigation information in the task prompting area may be hidden, or even the task prompting area may be hidden and folded as shown in FIG. 11. Further, the entry corresponding to Task 1 in the task list is also prominently displayed to indicate that Task 1 is the candidate virtual task to be performed on the destination that the target virtual character is currently automatically navigated to.

In some embodiments, after the target virtual task is selected, the target directional navigation information is displayed in the center of the movement control, and the directional navigation information for other candidate virtual tasks is hidden, thereby saving the display space of the display interface, and avoiding obstruction on other display elements that need to be presented during the movement process of the target virtual character.

In some embodiments, the controlling the target virtual character to automatically move from the character position to the positions for performing the target tasks under an automatic navigation state includes:

S1: Hide the movement control; and

S2: Display state prompting information in the display interface to indicate that the target virtual character is in the automatic navigation state.

In some game applications, the movement control is not always displayed in the display interface, but only when a control trigger operation is detected. For example, only in a case that a touch press operation is detected in the lower left corner of the display interface, a universal wheel of the movement control is triggered and displayed at the touch point. In a case that no touch press operation is detected at the lower left corner of the display interface, the universal wheel of the movement control may, but not limited to, remain hidden.

In some embodiments, after the target virtual character enters the automatic navigation state, the movement control is maintained hidden, and the target virtual character being in the automatic navigation state is prompted in other forms in the display interface.

Figure 12:
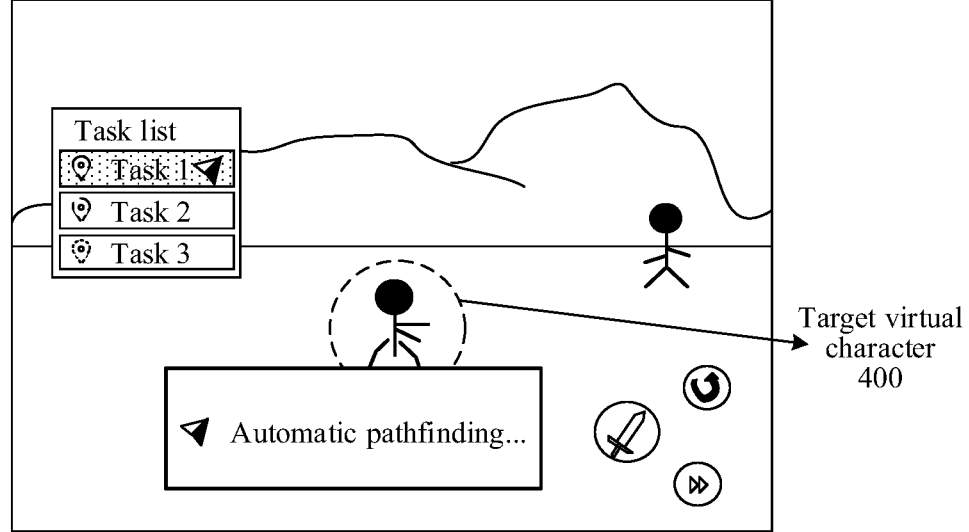
FIG. 12 is a schematic diagram of a method for prompting a task according to some embodiments.

FIG. 12 is a schematic diagram of a method for prompting a task according to some embodiments. In some embodiments, with reference to FIG. 12, the movement control is only displayed after a control trigger operation is detected. After Task 1 is selected as the target virtual task by a swiping operation, the target virtual character is controlled to enter a process of automatically navigating to the position for performing Task 1, and the movement control is hidden. Also, the target virtual character 400 is prompted "Automatic pathfinding . . . " in the display interface to indicate the target virtual character being in the automatic navigation state. Based on the prompt of Task 1 being prominently displayed in the task list, it may be determined that the position for performing Task 1 is the destination of the target virtual character.

In some embodiments, after the target virtual task is selected, under the condition that the movement control is hidden, the target virtual character being in the automatic navigation state is prompted in text, thereby intuitively displaying the current operating state of the target virtual character and avoiding unnecessary misoperation interfering the automatic navigation process.

In some embodiments, the controlling the target virtual character to automatically move from the character position to the positions for performing the target tasks under an automatic navigation state further includes at least one of the following operations:

1) Abort the Automatic Navigation State in a Case that the Target Virtual Character is Under Attack.

In some embodiments, the virtual game scene is a task scene provided for virtual characters. In a case that the task scenario indicates that virtual characters from different factions need to engage in adversarial attacks, the current automatic navigation state of the target virtual character is interfered and interrupted when the target virtual character is attacked by virtual characters from enemy factions.

2) Abort the Automatic Navigation State in a Case that the Movement Control is Triggered by Performance of a Target Trigger Operation.

In some embodiments, in a case that the movement control is detected to be triggered by performance of a target trigger operation during the automatic movement of the target virtual character, it indicates that a new task prompting navigation is needed or the destination of automatic navigation is to be adjusted. Thus, the current automatic navigation state of the target virtual character is aborted.

In some embodiments, not only the target virtual character may be triggered to enter the automatic navigation state, but also the automatic navigation state may be actively or passively terminated at any time, such that other control operations on the target virtual character may be triggered, or the destination to be automatically navigated may be determined and updated for the target virtual character, thereby achieving flexible control and adjustment of automatic navigation.

In some embodiments, during prompting directional navigation information for the positions for performing tasks, at prompting positions that match the relative position relationships in a task prompting area configured for the movement control, the following operations are included:

S1: Determine an endpoint position of the trajectory of a swiping operation in response to the swiping operation performed on the movement control; and S2: Control the target virtual character to continuously move towards the target direction in a case that the endpoint position is in a target movement direction lock-in area configured for the movement control.

In some embodiments, the target movement direction lock-in area may refer to that, but not limited to, the movement direction of the target virtual character is locked, such that the target virtual character continuously moves in the selected direction without the need for continuous control of the operation movement control. Here the target movement direction lock-in area does not overlap the display area of the directional navigation information, to avoid misoperation where both the target movement direction lock-in area and the directional navigation information are triggered simultaneously or cannot be triggered.

Figure 13:
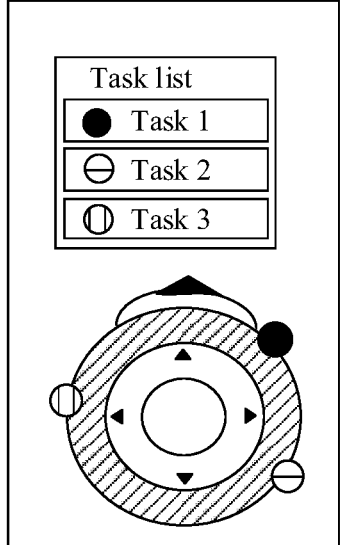
FIG. 13 is a schematic diagram of a method for prompting a task according to some embodiments.

FIG. 13 is a schematic diagram of a method for prompting a task according to some embodiments. In some embodiments, the arrow indicated area directly above the movement control is a preconfigured direction of advance lock-in area. In a case that the endpoint position of the swiping operation is detected to be in the direction of advance lock-in area, it indicates that automatic advancing is triggered, and the target virtual character will continuously move in the direction of advance. That is, while the directional navigation information is prompted in the task prompting area of the movement control, the target virtual character may be controlled to continuously move in the selected target direction.

In some embodiments, in a case that the endpoint position of the swiping operation is detected to be in the target movement direction lock-in area, it indicates that the target virtual character is triggered to start automatically advancing in the direction of advance, and will continuously move in the direction of advance. Thus, while the directional navigation information is prompted, the movement control operation on the target virtual character may be simplified, facilitating a user to perform other operations with hands, and expanding multiple control methods for the virtual characters.

In some embodiments, before displaying a virtual game scene where a target virtual character is located in a display interface, at least one of the following operations is included:

1) Configure a display style of the directional navigation information in the task prompting area; and 2) Configure a type of a virtual task for which the directional navigation information will be prompted in the task prompting area.

In some embodiments, the display style of the directional navigation information may include, but not limited to, the style of the navigation positioning icons, the style of the prompting position of the directional navigation information, the prominent displaying manner upon selection, and the like. For example, the style of the navigation positioning icons may be as shown in FIG. 6 (*a*)-(*b*), or as shown in FIG. 4 or 5. The prompting positions for the directional navigation information may be in the style as shown in FIG. 3 (*a*)-(*c*). The configuration of the display style and prompting manner is not limited in any way herein.

In some embodiments, the type of the virtual tasks to be prompted may be, but not limited to, configured. For example, as shown in FIG. 10, the task type may include: storyline tasks, treasure digging tasks, teammate prompted tasks, as well as clock in and point insertion tasks, instance tasks, and the like. The types of tasks involved and the number of tasks to be prompted are not limited in any way herein.

In some embodiments, the display style and prompt content are configured in advance to provide users with adaptive and flexible configuration methods to improve the user experience.

Figure 14:
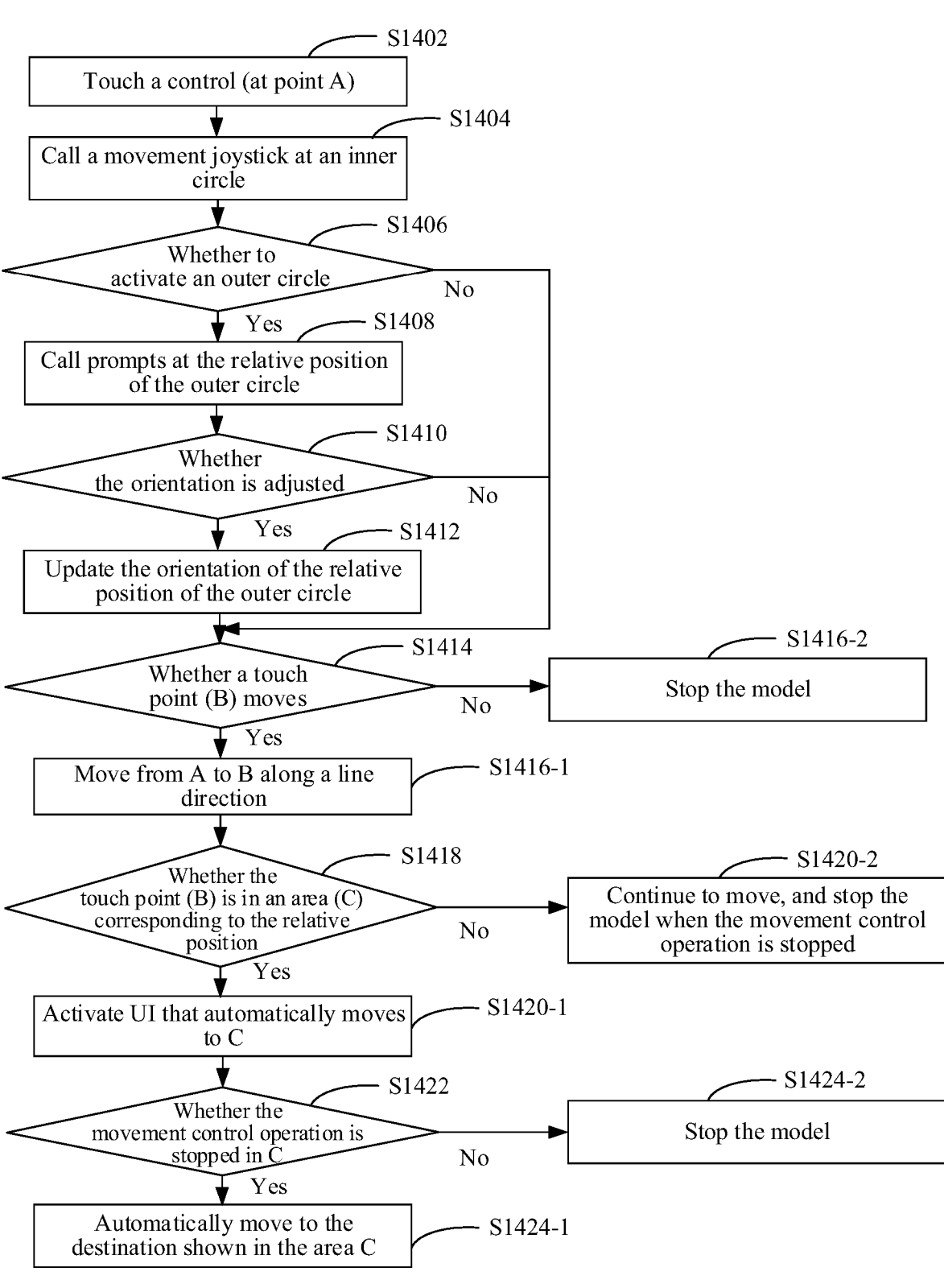
FIG. 14 is a flowchart of a method for prompting a task according to some embodiments.

This embodiment is applicable to a condition where the virtual candidate tasks to be performed are located outside the field of view presented in the current display interface, so that the positions for performing the tasks to be performed outside the field of view may be intuitively obtained based on the directional navigation information prompted in the task prompting area of the movement control. A user needs not to adjust the field of view or current position multiple times, the task prompting operations are simplified, and the functions of use of the movement control are enriched. Some embodiments of the method for prompting a task are described in conjunction with the flow as shown in FIG. 14, and the detailed flow includes operations S1402 to S1424-2.

S1402: Display a movement control wheel for controlling the movement of the target virtual character in the display interface displaying the virtual game scene. Detect the touch operations on the movement control wheel. If a touch point A is detected, perform S1404. The touch point A here refers to a point currently determined by a user's finger on a touch operation panel (or touch screen).

The movement control wheel may include an inner wheel and an outer wheel, which exist all the time. When the player changes the orientation of the virtual character by rotating, the wheel at the relative position of the outer circle will be adjusted and rotated accordingly.

S1404: Call the inner steering wheel (also called a movement joystick at the inner circle).

S1406: Determine whether to activate the outer circle.

The outer circle here refers to the task prompting area configured for the movement control.

S1408: Call prompts (i.e., the task prompting area) at the relative position of the outer circle if it is determined to activate the outer circle. Perform S1414 if the outer circle is not activated.

S1410: Detect whether the target virtual character adjusts the orientation. Perform S1414 if the orientation is not adjusted.

S1412: Control the relative position of the outer circle to update (make the wheel at the relative position of the outer circle synchronously adjusted and rotated with the orientation of the target virtual character) if the orientation is adjusted.

S1414: Determine whether a touch point B moves. The touch point B here refers to a point currently determined by a user's finger on a touch operation panel (or touch screen).

S1416-1: Display movement from A to B along the line direction in the display interface if it is detected that the touch point B moves. S1416-2: Control a model (i.e., a character model corresponding to the target virtual character) to stop if it is detected that the touch point B does not move, which means that no movement control is triggered on the target virtual character.

S1418: Determine whether the touch point B moves to the area C corresponding to the relative position.

S1420-1: Activate automatic navigation if it is detected that the touch point B moves to a UI control (directional navigation information for the target virtual task) in the area C. The automatic navigation function is to control the model (i.e., the character model corresponding to the target virtual character) to automatically move to the position for performing the task corresponding to the UI control. S1420-2: Control the model (i.e., the character model corresponding to the target virtual character) to continue to move according to the movement control operation triggered by the movement control and stop when the movement control operation is stopped if it is detected that the touch point B does not move to the UI control in the area C, which indicates that automatic navigation is not activated.

S1422: Determine whether the movement control operation is stopped (that is, it is detected that the touch point on the touch operation panel disappears) at the UI control in the area C.

S1424-1: Control the target virtual character to automatically move to the destination corresponding to the UI control in the area C (i.e. the position for performing the task) if it is detected that the movement control operation is stopped. S1424-2: Keep the model stop if it is not detected that the movement control operation is stopped in the area C.

The flow shown in FIG. 14 above is an example, and is not limited in any way in this embodiment.

To simplify the description, the foregoing method embodiments are described as a series of action combination. But a person of ordinary skill in the art should know that the disclosure is not limited to any described sequence of the action, as some operations can adopt other sequences or can be executed simultaneously. In addition, a person skilled in the art should also know that all the embodiments described in the specification are preferred embodiments, and the involved actions and modules are not necessary or required.

Some embodiments may provide an apparatus for prompting a task for implementing the foregoing method for prompting a task.

Figure 15:
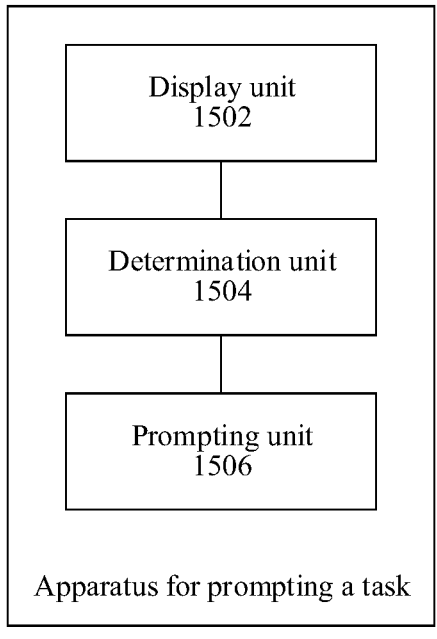
FIG. 15 is a schematic structural diagram of an apparatus for prompting a task according to some embodiments.

As shown in FIG. 15, the apparatus includes:

a display unit 1502, configured to display a virtual game scene where a target virtual character is located in a display interface, where virtual tasks to be performed by the target virtual character are set in the virtual game scene;

a determination unit 1504, configured to determine relative position relationships between a current position of the target virtual character and positions for performing candidate virtual tasks in response to a target trigger operation performed on a movement control in the display interface, where the movement control is configured to control the target virtual character to move in the virtual game scene, and the candidate virtual tasks are virtual tasks that have not yet been performed; and a prompting unit 1506, configured to prompt directional navigation information for the positions for performing tasks, at prompting positions that match the relative position relationships in a task prompting area configured for the movement control.

In some embodiments, the determination unit 1504 is further configured to determine a current orientation of the target virtual character at the character position; and determine relative position relationships between a current position of the target virtual character and positions for performing candidate virtual tasks based on the character orientation.

In some embodiments, the apparatus for prompting a task further includes:

a prompt position adjusting unit, configured to adjust a first relative position relationship corresponding to a first orientation to a second relative position relationship corresponding to a second orientation in a case that the orientation of the target virtual character is adjusted from the first orientation to the second orientation; and adjust the directional navigation information for the positions for performing tasks displayed in the task prompting area from a first prompting position corresponding to the first relative relationship to a second prompting position corresponding to the second relative position relationship.

In some embodiments, the prompting unit 1506 is further configured to display navigation positioning icons representing the directional navigation information at the prompting positions in the task prompting area configured on the outer boundary of the movement control; and display a task list in the display interface in areas other than the display area where the movement control is located, where the task list includes description information of the candidate virtual tasks and the navigation positioning icons matching the candidate virtual tasks.

In some embodiments, the prompting unit 1506 is further configured to obtain distances between the character position and the positions for performing tasks; and display the navigation positioning icons based on display transparency that matches the distance, where the farther the distance, the lower the corresponding display transparency.

In some embodiments, the prompting unit 1506 is further configured to obtain the connected state from the character position to the positions for performing tasks; and display a movement prompting marker for prompting allowance to move in a case that the connected state indicates that the target virtual character is allowed to move from the character position to the positions for performing tasks.

In some embodiments, the apparatus for prompting a task further includes:

a control unit, configured to determine the target virtual tasks to be performed by the target virtual character from the task prompting area in response to a swiping operation performed on the movement control; and control the target virtual character to automatically move from the character position to the positions for performing the target tasks under an automatic navigation state in a case that the movement conditions are met between the position of the target virtual character and the positions for performing the target virtual tasks.

In some embodiments, the control unit is further configured to determine an endpoint position of the trajectory of a swiping operation in response to the swiping operation; and prominently display the target directional navigation information corresponding to the target virtual task in a case that the target directional navigation information on the target prompting position corresponding to the target virtual task in the target virtual task prompting area is hit at the endpoint position.

In some embodiments, the control unit is further configured to display the target directional navigation information in the center of the movement control, and hide the directional navigation information corresponding to the candidate virtual tasks other than the target virtual task in the task prompting area.

In some embodiments, the control unit is further configured to hide the movement control; and display state prompting information in the display interface to indicate that the target virtual character is in the automatic navigation state.

In some embodiments, the control unit is further configured to at least one of the following: abort the automatic navigation state in a case that the target virtual character is under attack; and abort the automatic navigation state in a case that the movement control is triggered by performance of a target trigger operation.

In some embodiments, the apparatus for prompting a task further includes:

a character moving unit, configured to determine an endpoint position of the trajectory of a swiping operation in response to the swiping operation performed on the movement control; and control the target virtual character to continuously move towards the target direction in a case that the endpoint position is in a target movement direction lock-in area configured for the movement control.

In some embodiments, the apparatus for prompting a task further includes:

a configuration unit, configured to at least one of the following: configure a display style of the directional navigation information in the task prompting area; and configure a type of a virtual task for which the directional navigation information will be prompted in the task prompting area.

Figure 16:
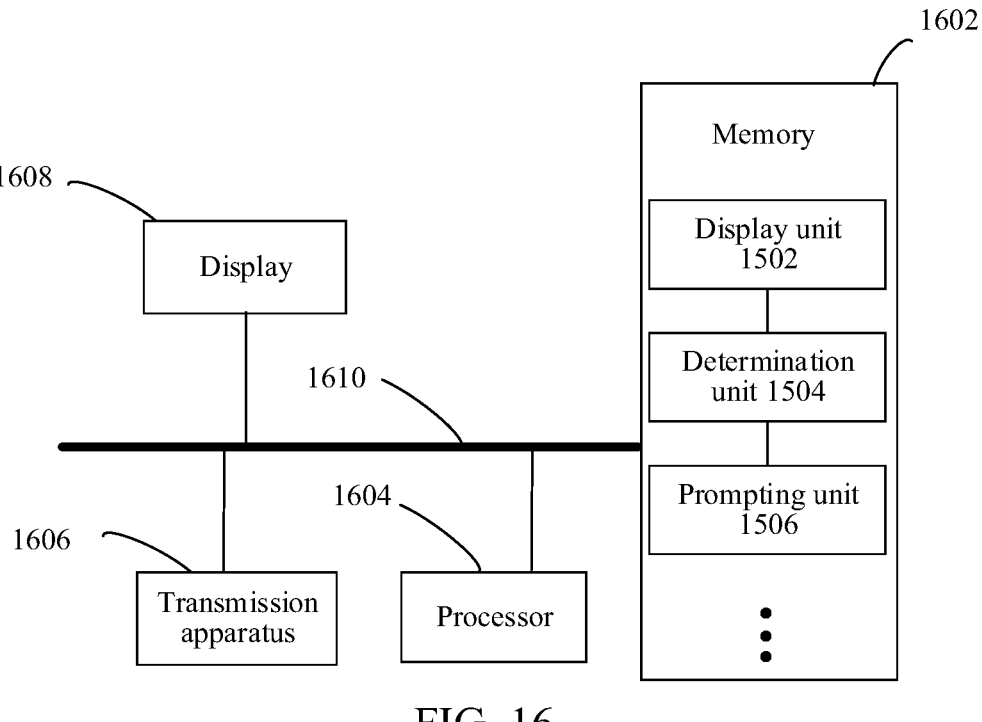
FIG. 16 is a schematic structural diagram of an electronic device according to some embodiments.

According to some embodiments, an electronic device for implementing the foregoing method for prompting a task is also provided, and the electronic device may be a terminal device or a server as shown in FIG. 1. In this embodiment, the electronic device being the terminal device is taken as an example for description. As shown in FIG. 16, the electronic device includes a memory 1602 and a processor 1604, where computer-readable instructions are stored in the memory 1602, and the processor 1604 is configured to perform the operations in any one of the foregoing method embodiments by the computer-readable instructions.

In some embodiments, the electronic device may be located in at least one network device of multiple network devices in a computer network.

In some embodiments, the processor may be configured to perform the following operations by the computer-readable instructions:

S1: Display a virtual game scene where a target virtual character is located in a display interface, where virtual tasks to be performed by the target virtual character are set in the virtual game scene;

S2: Determine relative position relationships between a current position of the target virtual character and positions for performing candidate virtual tasks in response to a target trigger operation performed on a movement control in the display interface, where the movement control is configured to control the target virtual character to move in the virtual game scene, and the candidate virtual tasks are virtual tasks that have not yet been performed; and S3: Prompt directional navigation information for the positions for performing tasks, at prompting positions that match the relative position relationships in a task prompting area configured for the movement control.

A person of ordinary skill in the art may understand that, the structure shown in FIG. 16 is only schematic. The electronic device also may be a terminal device such as a smartphone (e.g., an Android mobile phone or an iOS mobile phone), a tablet computer, a palmtop computer, a Mobile Internet Device (MID), or a PAD. FIG. 16 does not limit the structure of the foregoing electronic device. For example, the electronic device may further include more or less components (e.g., a network interface) than those shown in FIG. 16, or has a configuration different from that shown in FIG. 16.

The memory 1602 may be configured to store software programs and module, e.g., program instructions/modules corresponding to the method for prompting a task and apparatus according to some embodiments. The processor 1604 is configured to perform various functional applications and data processing by running the software programs and modules stored in the memory 1602, to implement the foregoing method for prompting a task. The memory 1602 may include a high-speed random memory, and may also include a non-volatile memory, e.g., one or more magnetic storage apparatuses, a flash memory, or other nonvolatile solid-state memories. In some embodiments, the memory 1602 may further include memories remotely disposed relative to the processor 1604, and the remote memories may be connected to a terminal through networks. Examples of the networks include, but not limited to, the Internet, an intranet, a local area network, a mobile communication network, and combinations thereof. The memory 1602 may be configured to, but not limited to, store the attribute information of target virtual characters, information of candidate virtual tasks, positions for performing the candidate virtual tasks, and the like. As an example, as shown in FIG. 16, the memory 1602 may include, but not limited to, the display unit 1502, the determination unit 1504, the prompting unit 1506, and the processing unit 1108 in the foregoing apparatus for prompting a task. In addition, the memory 1602 may further include, but not limited to, other modular units in the apparatus for prompting a task, which will not be repeated in this example.

In some embodiments, the electronic device further includes a transmission apparatus 1606, configured to receive or send data through a network. Examples of the network include a wired network and a wireless network. In some embodiments, the transmission apparatus 1606 includes a Network Interface Controller (NIC) that may be connected to other network devices and routers through network cables, to communicate with the Internet or a local area network. In some embodiments, the transmission apparatus 1606 is a Radio Frequency (RF) module, configured to communicate with the Internet in a wireless manner.

A person skilled in the art would understand that these "units" could be implemented by hardware logic, a processor or processors executing computer software code, or a combination of both. The "units" may also be implemented in software stored in a memory of a computer or a non-transitory computer-readable medium, where the instructions of each unit are executable by a processor to thereby cause the processor to perform the respective operations of the corresponding unit.

Further, the electronic device includes a display 1608, configured to display the content in the foregoing virtual game scene and the directional navigation information in the task prompting area of the movement control; and a connection bus 1610, configured to connect the modular components in the electronic device.

In some embodiments, the foregoing terminal device or server may be a node in a distributed system, where the distributed system may be a blockchain system, and the blockchain system may be a distributed system formed by connecting multiple nodes via network communication. A Peer-To-Peer (P2P) network may be formed between the nodes, and any form of computing device, e.g., a server, a terminal and other electronic devices may become a node in the blockchain system by joining the peer-to-peer network.

According to some embodiments, a computer program product is provided, where the computer program product includes a computer program/computer instructions carried on a computer-readable medium, and the computer program/computer instructions includes/include program code for performing a method shown in a flowchart. In such an embodiment, the computer program may be downloaded from a network via a communication part and installed, and/or installed from a removable medium. When the computer program is executed by a central processing unit, the various functions provided above are executed.

According to some embodiments, a computer-readable storage medium is provided, where a processor of a computer device reads computer-readable instructions from the computer-readable storage medium, and the processor executes the computer-readable instructions, causing the computer device to perform the methods for prompting a task.

In some embodiments, the computer-readable storage medium may be configured to store computer-readable instructions for performing the following operations:

S1: Display a virtual game scene where a target virtual character is located in a display interface, where virtual tasks to be performed by the target virtual character are set in the virtual game scene;

S2: Determine relative position relationships between a current position of the target virtual character and positions for performing candidate virtual tasks in response to a target trigger operation performed on a movement control in the display interface, where the movement control is configured to control the target virtual character to move in the virtual game scene, and the candidate virtual tasks are virtual tasks that have not yet been performed; and S3: Prompt directional navigation information for the positions for performing tasks, at prompting positions that match the relative position relationships in a task prompting area configured for the movement control.

In some embodiments, a person of ordinary skill in the art may understand that, all or some operations in the methods in the foregoing embodiments may be performed by related hardware of a terminal device instructed by computer-readable instructions, and the computer-readable instructions may be stored in a computer-readable storage medium, e.g., a flash drive, a Read-Only Memory (ROM), a Random Access Memory (RAM), a magnetic disk, an optical disk, or the like. The computer-readable storage medium may be non-transient.

When the integrated unit in the foregoing embodiments are implemented in a form of a software functional unit and sold or used as an independent product, the integrated unit may be stored in a non-transitory computer-readable storage medium. Based on such an understanding, the technical solutions of the disclosure essentially, or a part contributing to the related art, or all or a part of the technical solutions may be implemented in the form of a software product. The computer software product is stored in a storage medium and includes several instructions for instructing one or more computer devices (which may be a PC, a server, a network device or the like) to perform all or some of operations of the methods in the embodiments.

In some embodiments, the descriptions of the embodiments have respective focuses. For a part that is not described in detail in an embodiment, refer to related descriptions in other embodiments.

In some embodiments, it is to be understood that, the disclosed client may be implemented in another manner. The apparatus embodiments described above are merely schematic. For example, the division of the units is merely a logic functional division, and may use other division manners during actual implementation. For example, multiple units or components may be combined, or may be integrated into another system; or some features may be omitted or not performed. In addition, the coupling, direct coupling, or communication connection between the displayed or discussed units or modules may be indirect coupling or communication connection between the units or modules by means of some interfaces, or electrically or in other manners.

The units described as separate components may or may not be physically separated, and the components displayed as units may or may not be physical units, and may be located in one place or may be distributed over multiple network units. Some or all of the units may be selected according to actual needs to achieve the objectives of the solutions of this embodiment.

In addition, functional units in some embodiments may be integrated in one processing unit, or each of the units may be physically separated, or two or more units may be integrated in one unit. The integrated unit may be implemented in the form of hardware, or may be implemented in the form of a software functional unit.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure and the appended claims.

What is claimed is:

1. A method, performed by an electronic device, the method comprising:

displaying a virtual game scene in which a target virtual character in a virtual game is located in a display interface and in which target locations in the virtual game are set;

determining relative position relationships between a character position of the target virtual character and the target locations; and obtaining distances between the character position and the target locations, and displaying, in an outer boundary of an movement control interface and a task prompting area at prompting positions corresponding to the relative position relationships, directional navigation icons corresponding to the target locations using a display transparency that corresponds to the distances, respectively.

2. The method according to claim 1, wherein determining the relative position relationships comprises:

determining a character orientation of the target virtual character at the character position; and determining the relative position relationships between the character position and the target locations based on the character orientation.

3. The method according to claim 1, wherein after displaying the directional navigation icons, the method further comprises:

a relative position between the character position and at least one of the target locations changes, updating the directional navigation icons based on movement of the character position.

4. The method according to claim 1, wherein the relative position relationships are determined based on a target trigger operation according to a movement control in the display interface, and wherein the task prompting area includes the movement control.

5. The method according to claim 4, wherein displaying the directional navigation icons comprises:

displaying a task list in the display interface in areas of the display interface other than a display area in which the movement control is located, the task list comprising description information of the target locations and directional navigation icons corresponding to the target locations.

6. The method according to claim 1, wherein displaying the directional navigation icons comprises:

obtaining a connected state between the character position and the target locations; and displaying a movement prompting marker corresponding to a target position based on the connected state indicating that the target virtual character is allowed to move from the character position to the corresponding target position.

7. The method according to claim 4, wherein after displaying the directional navigation icons, the method further comprises:

determining a target destination among the target locations, based on a swiping operation performed on the movement control; and controlling the target virtual character to move from the character position to the target destination according to an automatic navigation state based on movement conditions between the character position and a target location that corresponds to the target destination being met.

8. The method according to claim 7, wherein determining the target destination comprises:

determining an endpoint position of a trajectory of the swiping operation; and determining a directional navigation icon that is hit by the endpoint position, among the directional navigation icons, wherein the target destination comprises the directional navigation icon that is determined.

9. The method according to claim 4, wherein the movement control comprises a joystick, and wherein an operation of pushing the joystick toward a directional navigation icon controls the target virtual character to move toward a target location corresponding to the directional navigation icon in the virtual game scene.

10. An apparatus comprising:

at least one memory configured to store computer program code;

at least one processor configured to read the program code and operate as instructed by the program code, the program code comprising:

display code configured to cause at least one of the at least one processor to display a virtual game scene in which a target virtual character in a virtual game is located in a display interface and in which target locations are set;

determination code configured to cause at least one of the at least one processor to determine relative position relationships between a character position of the target virtual character and the target locations; and prompting code configured to cause at least one of the at least one processor to:

obtain distances between the character position and the target locations, and display, in an outer boundary of an movement control interface and a task prompting area at prompting positions corresponding to the relative position relationships, directional navigation icons corresponding to the target locations using a display transparency that corresponds to the distances, respectively.

11. The apparatus according to claim 10, wherein the determination code is further configured to cause at least one the at least one processor to:

determine a character orientation of the target virtual character at the character position; and determine the relative position relationships between the character position and the target locations based on the character orientation.

12. The apparatus according to claim 10, wherein the program code further comprises:

prompt position adjusting code configured to cause at least one of the at least one processor to, when a relative position between the character position and at least one of the target locations changes, update the directional navigation icons based on movement of the character position.

13. The apparatus according to claim 10, wherein the relative position relationships are determined based on a target trigger operation according to a movement control in the display interface, and wherein the task prompting area includes the movement control.

14. The apparatus according to claim 13, wherein the prompting code is further configured to cause at least one of the at least one processor to:

display a task list in the display interface in areas of the display interface other than a display area in which the movement control is located, the task list comprising description information of the target locations and the directional navigation icons corresponding to the target locations.

15. The apparatus according to claim 13, wherein the prompting code is further configured to cause at least one of the at least one processor to:

determine a target destination among the target locations, based on a swiping operation performed on the movement control; and control the target virtual character to move from the character position to the target destination according to an automatic navigation state based on movement conditions between the character position and a target location that corresponds to the target destination being met.

16. A non-transitory computer-readable storage medium storing computer code which, when executed by at least one processor, causes the at least one processor to at least:

display a virtual game scene in which a target virtual character in a virtual game is located in a display interface and in which target locations in the virtual game are set;

determine relative position relationships between a character position of the target virtual character and the target locations;

obtain distances between the character position and the target locations; and display, in an outer boundary of an movement control interface and a task prompting area at prompting positions corresponding to the relative position relationships, directional navigation icons corresponding to the target locations using a display transparency that corresponds to the distances, respectively.

* * * * *